United States Patent
Pfaller et al.

(10) Patent No.: US 7,250,186 B2
(45) Date of Patent: *Jul. 31, 2007

(54) EXTRUSION PROCESS, APPARATUS AND PRODUCT

(75) Inventors: Werner Pfaller, Orbe (CH); Ernst Heck, Vufflens-la-Ville (CH); Jean Horisberger, Ecublens (CH)

(73) Assignee: Nestec S.A., Vevey (CH)

( * ) Notice: Subject to any disclaimer, the term of this patent is extended or adjusted under 35 U.S.C. 154(b) by 480 days.

This patent is subject to a terminal disclaimer.

(21) Appl. No.: 10/608,993

(22) Filed: Jun. 27, 2003

(65) Prior Publication Data

US 2004/0058044 A1    Mar. 25, 2004

Related U.S. Application Data

(63) Continuation of application No. PCT/EP01/14734, filed on Dec. 11, 2001.

(30) Foreign Application Priority Data

Dec. 29, 2000    (EP) .................................. 00204760

(51) Int. Cl.
    *A23P 1/12*    (2006.01)
(52) U.S. Cl. ............... 426/549; 426/559; 426/504; 426/508; 426/516; 426/518; 426/519; 426/523; 426/805

(58) Field of Classification Search ........... 426/549, 426/559, 560, 578, 496, 504, 506–508, 516–520, 426/523, 805
    See application file for complete search history.

(56) References Cited

U.S. PATENT DOCUMENTS

| | | | | |
|---|---|---|---|---|
| 4,230,503 A | * | 10/1980 | Hughes | 127/1 |
| 4,568,550 A | * | 2/1986 | Fulger et al. | 426/19 |
| 5,198,261 A | * | 3/1993 | Sasaki et al. | 426/643 |
| 5,538,748 A | * | 7/1996 | Boatman et al. | 426/516 |
| 5,667,833 A | | 9/1997 | Juengling et al. | 426/496 |
| 5,840,359 A | * | 11/1998 | Lechthaler et al. | 426/516 |
| 5,997,934 A | | 12/1999 | Geromini et al. | 426/549 |
| 6,338,867 B1 | * | 1/2002 | Lihotzky-Vaupel | 426/557 |
| 6,551,645 B1 | * | 4/2003 | Hauser et al. | 426/557 |
| 6,866,878 B1 | * | 3/2005 | Battaglia | 426/516 |

* cited by examiner

*Primary Examiner*—Drew Becker
(74) *Attorney, Agent, or Firm*—Bell, Boyd & Lloyd LLP

(57) ABSTRACT

A process for the manufacture of cooked cereals or dry pet food by preparing a mixture of water and a dry premix mainly comprising cereal flour or semolina, and pressing the mixture, with the aid of a gear pump, firstly through a heat exchanger wherein it is cooked and then through an extrusion die to form an extruded product. Also, an apparatus for carrying out the process and a product obtainable by the process.

10 Claims, 1 Drawing Sheet

EXTRUSION PROCESS, APPARATUS AND PRODUCT

CROSS-REFERENCE TO RELATED APPLICATIONS

This application is a continuation of International application PCT/EP01/14734 filed Dec. 11, 2001, the content of which is expressly incorporated herein by reference thereto.

BACKGROUND ART

The present invention relates to an extrusion process for the manufacture of cooked cereals or dry pet food, an apparatus for carrying out the process and a product obtainable by the process.

U.S. Pat. No. 5,997,934 (Geromini et al.) discloses a process for the manufacture of cooked cereals or dry pet food which comprises preparing a mixture of water and a dry premix mainly comprising cereal flour or semolina, cooking the mixture and extruding it by pressing it through an extrusion die with the aid of a gear pump.

U.S. Pat. No. 5,667,833 (Juengling et al.) discloses a process and an equipment for manufacturing pasta which comprises preparing a mixture of cereal flour and water having a water content of 25-40%, kneading the mixture and extruding it by pressing it through an extrusion die with the aid of a gear pump.

It would be desirable to provide an extrusion process and apparatus which maintains the molecular structure of the starch in order to manufacture a product with properties that are close to those of a traditional roller-dried product but superior to those of a traditional cooked-extruded product.

As a matter of fact a traditional roller-dried product was not subjected to any mechanical stress during its entire manufacturing process, because a traditional roller-dried product was obtained by roller-drying a cooked slurry mainly comprising cereal flour and 40-45% water, with the slurry having been cooked in a vat and the drying effect being obtained by pure heat transfer from the roller to the film of slurry applied on its surface.

On the other hand, a traditional cooked-extruded product was subjected to high shear during its manufacturing process, because it was subjected to high pressure and friction while being cooked in the extruder.

The process of Geromini et al. mentioned above in fact comprises extrusion-cooking the mixture of water and flour before pressing it through an extrusion die with the aid of a gear pump.

On the contrary, the whole process of Juengling et al. mentioned above is carried out while maintaining the temperature of the mixture of water and flour or semolina below 55° C. so that a raw pasta is obtained, without any gelatinization of the flour or semolina. Neither process can accomplish the desired objectives.

In view of these deficiencies of the prior art, there is a need for improved processes and products with improved properties, and these are now provided by the present invention.

SUMMARY OF THE INVENTION

The present invention relates to a process for the manufacture of cooked cereals or dry pet food. This process comprises preparing a mixture of water and a dry premix mainly comprising cereal flour or semolina, and pressing the mixture using a gear pump comprising two toothed wheels which mesh with each other with the teeth being configured and dimensioned to avoid shearing the mixture as they mesh. The gear pump forces the mixture first into a heat exchanger and then through an extrusion die to form an extruded product. Also, the mixture is cooked in the heat exchanger to provide a gelatinization degree of at least 85% before passing through the extrusion die. The resulting extruded product has properties which are similar to those of a roller dried product that is not subjected to stress during manufacture. Preferably, the gear pump is operated to impart organoleptic properties to the extruded product which are superior to those of an extruded product that is subject to pressure and friction while being cooked in an extruder.

The invention also relates to an apparatus for the manufacture of cooked cereals or dry pet food, which comprises, in series, a mixing device for preparing a mixture of the water and dry premix, a gear pump of the type described above and being located downstream of the mixing device, a heat exchanger located downstream of the gear pump for cooking the mixture, and an extrusion die forming an outlet of the apparatus for extruding the cooked mixture as an extruded product.

If desired, the apparatus further comprises an inlet hopper for introducing the water and dry premix into the mixing device and a cutting device operatively associated with the extrusion die for cutting the extruded product into predetermined smaller length segments.

In the process and apparatus, the gear pump is generally operated to exert a pressure of (a) from 100 to 200 kPa upstream of the pump; (b) from 3,000 to 25,000 kPa upstream of the heat exchanger; and (c) from 2,000 to 10,000 kPa downstream of the heat exchanger. Also, the mixture is preferably cooked by progressively heating it to 90-180° C. for 2 to 15 minutes as the mixture passes through the heat exchanger.

The invention also relates to a cooked cereal product or dry pet food obtainable by the process or apparatus described herein. The cooked cereal product or dry pet food typically includes one or a combination of the following properties:

organoleptic properties which are superior to those of an extruded product that is subject to pressure and friction while being cooked in an extruder.

an expansion degree of from 1.5 to 10;

a gelatinization degree of at least 85%, a starch profile that is similar to that of a roller dried product that is not subjected to stress during manufacture and that is characterized by respective proportions of 40-70% amylopectin, 5-22% intermediates and 15-35% amylose; and a water content of 12-45%.

BRIEF DESCRIPTION OF THE DRAWING FIGURES

Embodiments of the present apparatus are described below by way of example only with reference to the accompanying drawings in which.

DETAILED DESCRIPTION OF THE PREFERRED EMBODIMENTS

Figure 1:
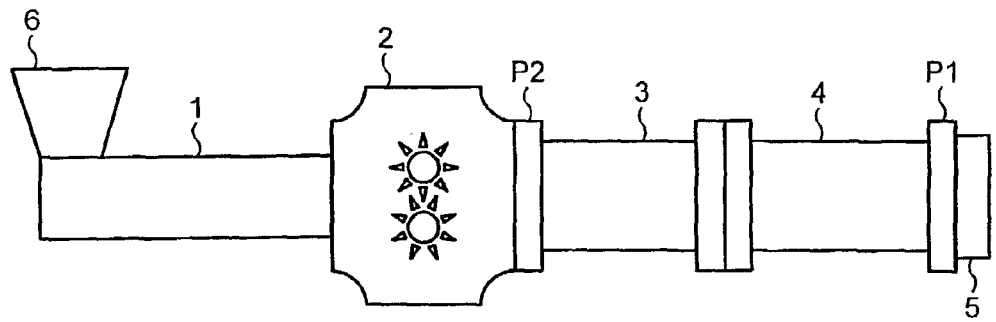
FIG. 1 is a schematic view of an embodiment of the present apparatus.

The process for the manufacture of cooked cereal products or dry pet food according to the present invention generally comprises preparing a mixture of water and a dry premix mainly comprising cereal flour or semolina, and pressing the mixture, with the aid of a gear pump, firstly through a heat exchanger wherein it is cooked and then through an extrusion die. Likewise, the apparatus for the manufacture of cooked cereal products or dry pet food according to the present invention comprises a mixing device, a gear pump, a heat exchanger and an extrusion die connected in series.

Throughout the present specification and claims, the expression "mainly comprising cereal flour or semolina" means comprising at least 50% or preferably at least 70% of cereal flour or semolina.

Similarly, the expression "a mixture of water and a dry premix" means "either a mixture of water and dry premix or a mixture of steam, water and dry premix".

It has been observed, surprisingly, that it is possible with such a process and such an apparatus to maintain the starch's molecular structure in order to manufacture a cooked cereal product or dry pet food with properties close to those of a traditional roller-dried product and superior to those of a traditional cooked-extruded product.

This fact may especially be observed by comparing the respective gelatinization degrees and starch profiles.

The degree of gelatinization indicates the efficiency of the heat exchanger and how well the product was cooked. Typically, gelatinization of at least 85%, preferably of 90% or more indicates a sufficiently cooked cereal. The starch profile describes the repartition of the two functional molecules of starch, amylose and amylopectin that directly influence important properties of the final product (e.g. viscosity, texture, solubility, and stickiness). Mechanical stress as applied in traditional single- and twin-screw extrusion mainly destroys the amylopectin fraction thus reducing viscosity and increasing solubility and stickiness. This is why existing products made with low-shear technologies (roller drying, high moisture cooking) cannot be exactly copied by extrusion. Therefore, the present process aims to maintain the initial starch profile by reducing shear. This is the precondition to obtaining products with properties similar to those of roller dried or high moisture cooked products.

Thus, the product obtainable by the present process and apparatus preferably has a gelatinization degree of at least 85%, more preferably of 90% or more.

It also preferably has a starch profile characterized by respective proportions of 40-70% amylopectin, 5-22% intermediates and 15-35% amylose.

In addition, the present product preferably has an expansion degree of from 1.5 to 10, more preferably of from 2 to 6.

To carry out the present process for manufacturing cooked cereals, it is possible to prepare a dry premix comprising 70-88% of a flour or semolina of a cereal such as wheat, oat, corn and/or rice, and up to 20% of sugars such as sucrose and dextrose, to which other traditional ingredients may be added such as up to 2% of sodium chloride, up to 8% of oil or fat such as vegetable oil or fat or butter oil, up to 15% of modified starches such as modified corn or wheat starches, up to 10% of powdered milk or other protein source, up to a few % of cocoa powder, up to a few % of malt, up to 0.5% of mineral salts, up to 0.5% of vitamins, up to 2% antioxidants, and possibly even enzymes which can reduce the viscosity of the mixture to be prepared, for example.

For manufacturing dry pet food, it is possible to prepare a dry premix comprising at least 50% of cereal flour, 25-35% of meat flour and animal by-products, 5-15% fat and tallow, up to 10% vegetable by-products and up to 6% vitamins and minerals, for example.

For manufacturing either cooked cereals or dry pet food it is possible with the mixing device to prepare a mixture of water and the premix such that the mixture has a water content of 12-45%, preferably of 12-30% and more preferably of 12-22% by weight.

The still un-cooked mixture is then pressed into the heat exchanger with the aid of a gear pump. To this end the gear pump may be fed with this mixture in a continuous, steady way, while exerting on it a relatively low pressure of the order of from about 100 to 2000 kPa upstream of the gear pump.

It is then possible to have the gear pump exerting a pressure of from 3000 to 25000, preferably from 4000 to 20000 and more preferably from 5000 to 16000 kPa on the mixture upstream of the heat exchanger.

Because the residence time in the gear pump is short and the mechanical energy input is low, the original raw materials may reach the heat exchanger without any major molecular degradation.

It is possible to cook this mixture by progressively heating it to 90-180° C., preferably to 100-160° C. for 2 to 15 minutes along the heat exchanger, for example.

The cooking in the heat exchanger occurs by mainly thermal heat transfer thus maintaining the original molecular structure. The properties of such a cooked product will be close to that of a traditional roller-dried product and superior to that of a traditional cooked-extruded product.

In order to press the mixture through said extrusion die, it is possible to maintain a pressure of from 2000 to 10000, preferably from 3500 to 9000 and more preferably from 4000 to 8000 kPa downstream of the heat exchanger and upstream of the die. The pressure loss across the heat exchanger may be between 1000 and 20000, preferably between 1000 and 17000, and more preferably between 1000 and 12000 kPa.

It is possible to cut the extruded rope of cooked mixture thus obtained into pellets or puffs just at the exit of the die with the aid of a cutting device.

As to the present apparatus, the mixing device may be a high speed blade mixer, a twin-screw intermeshing and co-rotating mixer or extruder, or a single-screw extruder.

The heat exchanger preferably is a static mixer heat exchanger. The static mixer may be of any adequate type such as the one disclosed in U.S. Pat. No. 5,486,049 (Boatman et al.) or U.S. Pat. No. 5,538,748 (Boatman et al.) or those equipping standard SULZER tubular heat exchangers such as SULZER's SMR DN80 type static mixer heat exchanger, for example.

The gear pump may comprise trio toothed wheels, or toothed rollers which mesh with each other. The two rollers can rotate in a housing on axles situated in a plane perpendicular to the direction of a mixture stream. They can each rotate in the opposite direction, the teeth coming apart upstream and closing again downstream. The outer edge of the teeth can slide against a corresponding inner wall of said housing, thus defining interstitial spaces intended for transporting the mixture to be extruded downstream. The shape of the teeth may be especially designed to avoid as much possible any shearing on the mixture.

The extrusion die may comprise one or more extrusion conduits, especially cylindrical conduits, generally oriented in the same direction as that of a stream of cooked mixture to be extruded, for example. The shape of the extruded rope may be determined in particular by the shape of the outlet opening or orifice of the conduits.

A typical cutting device comprises a rotating knife.

As represented in FIG. 1, the present apparatus comprises a mixing device 1, a gear pump 2, a heat exchanger 3/4, and an extrusion die 5 connected in series.

For carrying out the present process, the mixer 1 may be fed with the different components of the mixture through a hopper 6. At a downstream end of the mixer 1, a still uncooked but homogeneous mixture may be obtained. The gear pump 2 may be fed with this mixture in a continuous, steady way. The mixture may be pressed by the gear pump 2 firstly through the heat exchanger 3/4 (under the effect of a pressure $p_2$ exerted upstream of the heat exchanger), where it is cooked, and then through the die 5 (under the effect of a pressure $p_1$ maintained downstream of the heat exchanger and upstream of the die).

Figure 2:
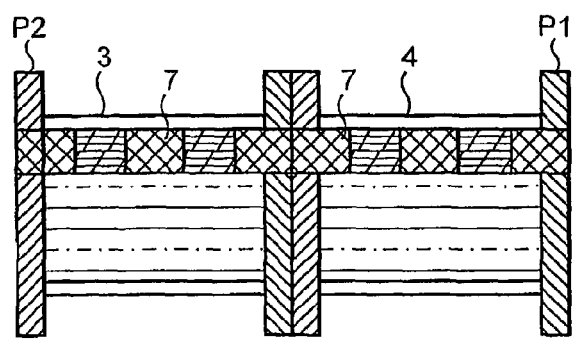
FIG. 2 is a schematic view of a heat exchanger static mixer which may be used in the embodiment of the apparatus represented in FIG. 1.

In the embodiment represented in FIG. 2, the heat exchanger comprises two double jacketed, heatable barrels 3 and 4 filled with non heatable static mixers 7.

Figure 3:
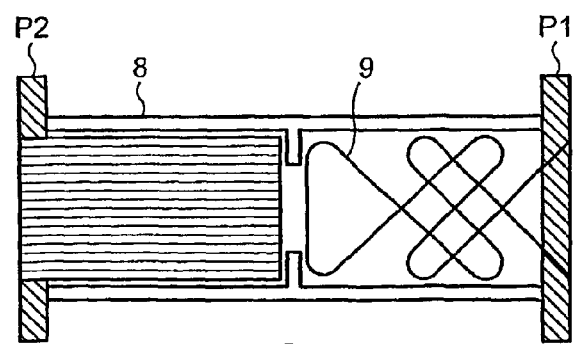
FIG. 3 is a schematic view of another heat exchanger static mixer which may be used in an embodiment of the apparatus similar to the one represented in FIG. 1.

In the embodiment represented in FIG. 3, the heat exchanger comprises one non heatable barrel 8 filled with a heatable static mixer 9.

EXAMPLES

The process and the product according to the present invention are described in greater detail in the examples presented below by way of illustration. The percentages are given therein by weight.

Example 1

An apparatus corresponding to the embodiment represented in FIG. 1 was used, which comprised a mixer in form of a twin screw side-feeder, a Vacorex 70/70 type MAAG gear pump, a heat exchanger as disclosed in U.S. Pat. Nos. 5,486,049 or 5,538,748 and represented in FIG. 2, and a die in form of a steel plate provided with four cylindrical conduits each having a circular outlet opening 4 mm in diameter.

A mixture of rice flour and water having a water content of 34% was prepared in the mixer which was fed with 48.2 kg/h of rice flour and 16.8 kg/h of water.

The mixture was pressed by the gear pump through the heat exchanger under a pressure $p_2$ of 12200 kPa. The double jacketed barrels of the heat exchanger were heated to a temperature of 130° C. with high pressure water. The mixture was thus cooked by having it heated to 117° C. in a few min through the heat exchanger.

The pressure loss along the heat exchanger was 9800 kPa so that the mixture was then pressed through the die under a remaining pressure of 2400 kPa.

The product thus obtained had a gelatinization degree of 90.3%.

The product had a starch profile characterized by respective proportions of 59.4% amylopectin, 15.2% intermediates and 25.4% amylose.

Example 2

An apparatus corresponding to the embodiment represented in FIG. 1 was used, which comprised a mixer in form of a twin screw side-feeder, a Vacorex 70/70 type MAAG gear pump, an SMR DN80 type SULZER static mixer heat exchanger such as represented in FIG. 3, and a die in form of a steel plate provided with two cylindrical conduits each having a circular outlet opening 4 mm in diameter.

A mixture of rice flour and water having a water content of 30% was prepared in the mixer which was fed with 51.1 kg/h of rice flour and 16.8 kg/h of water.

The mixture was pressed by the gear pump through the heat exchanger under a pressure $p_2$ of 12200 kPa. The static mixer of the heat exchanger was heated to a temperature of 130° C. with high pressure water. The mixture was thus cooked by having it heated to 102° C. in a few min through the heat exchanger.

The pressure loss along the heat exchanger was 6900 kPa so that the mixture was then pressed through the die under a remaining pressure of 5300 kPa.

The product thus obtained had a gelatinization degree of 92.1%.

The product had a starch profile characterized by respective proportions of 65.0% amylopectin, 16.7% intermediates and 18.3% amylose.

Example 3

The same apparatus was used as in Example 2.

A mixture having a water content of 27% was prepared in the mixer which was fed with 51.6 kg/h of a premix comprising 85% rice flour and 15% sugar, 13.4 kg/h of water and 0.5 kg/h of oil.

The mixture was pressed by the gear pump through the heat exchanger under a pressure $p_2$ of 10900 kPa. The static mixer of the heat exchanger was heated to a temperature of 150° C. with high pressure water. The mixture was thus cooked by having it heated to 118° C. in a few min through the heat exchanger.

The pressure loss along the heat exchanger was 5500 kPa so that the mixture was then pressed through the die under a remaining pressure of 5400 kPa.

The product thus obtained had a gelatinization degree of 93.3%.

The product had a starch profile characterized by respective proportions of 57.9% amylopectin, 20.7% intermediates and 21.4% amylose.

Example 4

The same apparatus was used as in Example 2.

A mixture having a water content of 20.3% was prepared in the mixer which was fed with 57.1 kg/h of a premix comprising 55% rice flour, 28% corn semolina, 13% sugar and malt and 4% cocoa powder, 7.9 kg/h of water and 2.3 kg/h of oil.

The mixture was pressed by the gear pump through the heat exchanger under a pressure $p_2$ of 13500 kPa. The static mixer of the heat exchanger was heated to a temperature of 150° C. with high pressure water. The mixture was thus cooked by having it heated to 121° C. in a few min through the heat exchanger.

The pressure loss along the heat exchanger was 6000 kPa so that the mixture was then pressed through the die under a remaining pressure of 7500 kPa.

The product thus obtained had a gelatinization degree of 85% and an expansion degree of 1.5.

The product had a starch profile characterized by respective proportions of 51.6% amylopectin, 20.2% intermediates and 28.2% amylose.

Comparative Example

For the purpose of comparison with the product obtained in Example 4 a comparative sample was produced from the same starting mixture but using a BC72H type CLEXTRAL twin-screw extruder instead of the present apparatus.

The extruder was provided with a die in form of a steel plate provided with six cylindrical conduits each having a circular outlet opening 3 mm in diameter.

The extruder was fed with about 3.5 times the amount of starting mixture with whom the mixer was fed in Example 4.

The extruder barrels were heated to achieve the same product temperature as in the SULZER heat exchanger.

The comparative product thus obtained had a gelatinization degree of 84%.

The comparative product had a starch profile characterized by respective proportions of 28.3% amylopectin, 48.3% intermediates and 23.4% amylose.

Thus the relatively low proportion of amylopectin remaining in the comparative product and the relatively high content in intermediates found in the comparative product stood in surprisingly stark contrast with the relatively high proportion of amylopectin maintained in the product of Example 4 and the relatively low content in intermediates found in the product of Example 4.

What is claimed is:

1. A process for the manufacture of cooked cereals or dry pet food, the process comprising preparing an uncooked mixture of water and a dry premix mainly comprising cereal flour or semolina, pressing the uncooked mixture using a gear pump comprising two toothed wheels which mesh with each other with the teeth being configured and dimensioned to avoid shearing the uncooked mixture as they mesh, with the gear pump forcing the uncooked mixture first into a heat exchanger and then through an extrusion die to form an extruded product; and cooking the uncooked mixture in the heat exchanger to provide a gelatinization degree of at least 85% before the cooked mixture passes through the extrusion die; the extruded product comprising a starch profile having respective proportions of 40-70% amylopectin, and 15-35% amylose.

2. The process of claim 1 wherein the mixture is cooked in the heat exchanger to provide a gelatinization degree of at least 90% before the mixture passes through the extrusion die.

3. The process of claim 1 wherein the product is extruded through the extrusion die to an expansion degree of 1.5 to 10.

4. The process of claim 1 wherein the product is extruded through the extrusion die to an expansion degree of 2 to 6.

5. The process of claim 1, which comprises preparing a mixture of water and the premix such that the mixture has a water content of 12-45%.

6. The process of claim 1 wherein the premix contains at least 70% of cereal flour or semolina.

7. The process of claim 1, which further comprises operating the gear pump to exert a pressure of (a) from 100 to 200 kPa upstream of the pump; (b) from 3,000 to 25,000 kPa upstream of the heat exchanger; and (c) from 2,000 to 10,000 kPa downstream of the heat exchanger.

8. The process of claim 7, wherein the gear pump is operated to exert a pressure of from 4,000 to 20,000 kPa upstream of the heat exchanger; and from 3,500 to 9,000 kPa downstream of the heat exchanger.

9. The process of claim 7, wherein the gear pump is operated to exert a pressure of from 5,000 to 16,000 kPa upstream of the heat exchanger, and from 4,000 to 8,000 kPa downstream of the heat exchanger.

10. The process of claim 1, wherein the mixture is cooked by progressively heating the mixture to 90-180° C. for 2 to 15 minutes as the mixture passes through the heat exchanger.

* * * * *